(12) United States Patent
Allen et al.

(10) Patent No.: US 6,681,273 B1
(45) Date of Patent: Jan. 20, 2004

(54) HIGH PERFORMANCE, VARIABLE DATA WIDTH FIFO BUFFER

(75) Inventors: Michael Allen, Austin, TX (US); Tim Landreth, Hopkinton, MA (US); Ryo Inoue, Austin, TX (US); Ravi Pratap Singh, Austin, TX (US)

(73) Assignee: Analog Devices, Inc., Norwood, MA (US)

( * ) Notice: Subject to any disclaimer, the term of this patent is extended or adjusted under 35 U.S.C. 154(b) by 416 days.

(21) Appl. No.: 09/652,685

(22) Filed: Aug. 31, 2000

(51) Int. Cl.⁷ .................................................. G06F 13/00
(52) U.S. Cl. ........................ 710/52; 710/4; 710/20; 710/33; 710/36; 710/56; 710/310
(58) Field of Search ............................. 710/4, 20, 33, 710/36, 52, 56, 310

(56) References Cited

U.S. PATENT DOCUMENTS 5,325,486 A * 6/1994 Omori et al. ............... 345/562
5,740,394 A * 4/1998 Minemura et al. .......... 710/310
5,996,031 A * 11/1999 Lim et al. ..................... 710/52

* cited by examiner

Primary Examiner—Jeffrey Gaffin
Assistant Examiner—Mohammad O. Farooq
(74) Attorney, Agent, or Firm—Wolf, Greenfield & Sacks, P.C.

(57) ABSTRACT

Methods and apparatus are provided for transferring data words from a source to a destination. The apparatus includes a datapath buffer coupled by a first data bus to the source and coupled by a second data bus to the destination, write control logic for writing a first number of data words in the datapath buffer in response to a first source transfer condition and for writing a second number of data words in the datapath buffer in response to a second source transfer condition, and read control logic for reading the first number of data words from the datapath buffer in response to a first destination transfer condition and for reading the second number of data words from the datapath buffer in response to a second destination transfer condition.

38 Claims, 5 Drawing Sheets

HIGH PERFORMANCE, VARIABLE DATA WIDTH FIFO BUFFER

FIELD OF THE INVENTION

This invention relates to data transfers in computer systems and, more particularly, to methods and apparatus for performing efficient, alignment-independent data transfers using an intelligent FIFO buffer.

BACKGROUND OF THE INVENTION

Computer systems frequently encounter the need to transfer blocks of data to or from memory. For example, direct memory access (DMA) is widely used to relieve the central processing unit (CPU) of the burden of moving blocks of data to or from memory. A DMA controller separate from the CPU allows the CPU or an external data source to specify a data transfer operation and to return to normal processing, while the DMA controller carries out the data transfer operation independently of the CPU. A DMA operation may be specified by a source starting address, a destination starting address and the number of data words to be transferred.

One application of DMA transfers is in digital signal processors, which are special purpose computers that are designed to optimize performance for digital signal processor applications. Digital signal processor applications are characterized by real-time operation, high interrupt rates and intensive numeric computations. In addition, digital signal processor applications tend to be intensive in memory access operations and to require the input and output of large quantities of data. Some digital signal processor architectures have dual execution units and thus require large quantities of data for efficient operation. Data buses having widths of 64 bits allow the transfer of two 32-bit data words in a single clock cycle.

For maximum flexibility, both aligned and non-aligned memory accesses may be utilized. Aligned memory accesses are aligned to double 32-bit word boundaries, whereas non-aligned accesses are not aligned to double 32-bit word boundaries. Thus, a DMA transfer may have a source address that is aligned or non-aligned, and a destination address that is aligned or non-aligned. Depending on the source and destination addresses and the number of data words being transferred, several individual DMA transfers may be required to transfer a specified block of data.

Accordingly, there is a need for methods and apparatus for high speed data transfer of different numbers of data words, where the source and destination addresses may be aligned or non-aligned.

SUMMARY OF THE INVENTION

According to a first aspect of the invention, apparatus is provided for transferring data words from a source to a destination. The apparatus comprises a datapath buffer coupled by a first data bus to the source and coupled by a second data bus to the destination, write control logic for writing a first number of data words in the datapath buffer in response to a first source transfer condition and for writing a second number of data words in the datapath buffer in response to a second source transfer condition, and read control logic for reading the first number of data words from the datapath buffer in response to a first destination transfer condition and for reading the second number of data words from the datapath buffer in response to a second destination transfer condition.

The datapath buffer may comprise a first-in, first-out (FIFO) datapath buffer. The first source transfer condition may comprise an aligned source address, and the second source transfer condition may comprise a non-aligned source address. The first destination transfer condition may comprise an aligned destination address, and the second destination transfer condition may comprise a non-aligned destination address. The first number of data words may comprise a double data word, and the second number of data words may comprise a single data word.

The datapath buffer may comprise a first set of storage locations, such as even FIFO locations, and a second set of storage locations, such as odd FIFO locations. The datapath buffer may further comprise write alignment logic for directing data words from high and low sections of the first data bus to the first and second sets of storage locations in response to a write align signal. The datapath buffer may further comprise read alignment logic for directing data words from the first and second sets of storage locations to high and low sections of the second data bus in response to a read align signal.

Preferably, the first number of data words is written in the datapath buffer or read from the datapath buffer in a single transfer cycle and the second number of data words is written in the datapath buffer or read from the datapath buffer in a single transfer cycle. The datapath buffer, the write control logic and the read control logic may be configured for bi-directional data transfer between the source and the destination.

According to another aspect of the invention, a method is provided for transferring data words from a source to a destination. The method comprises the steps of providing a datapath buffer coupled by a first data bus to the source and coupled by a second data bus to the destination, writing a first number of data words in the datapath buffer in response to a first source transfer condition, writing a second number of data words in the datapath buffer in response to a second source transfer condition, reading the first number of data words from the datapath buffer in response to a first destination transfer condition, and reading the second number of data words from the datapath buffer in response to a second destination transfer condition.

The method may further comprise the steps of writing a third number of data words in the datapath buffer in response to a third source transfer condition, and reading the third number of data words from the datapath buffer in response to a third destination transfer condition.

According to a further aspect of the invention, apparatus for transferring data words comprises a datapath buffer coupled by a data bus to a source and write control logic for writing a first number of data words in the datapath buffer in response to a first source transfer condition and for writing a second number of data words in the datapath buffer in response to a second source transfer condition.

According to yet another aspect of the invention, apparatus for transferring data words comprises a datapath buffer coupled by a data bus to a destination and read control logic for reading a first number of data words from the datapath buffer in response to a first destination transfer condition and for reading a second number of data words from the datapath buffer in response to a second destination transfer condition.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
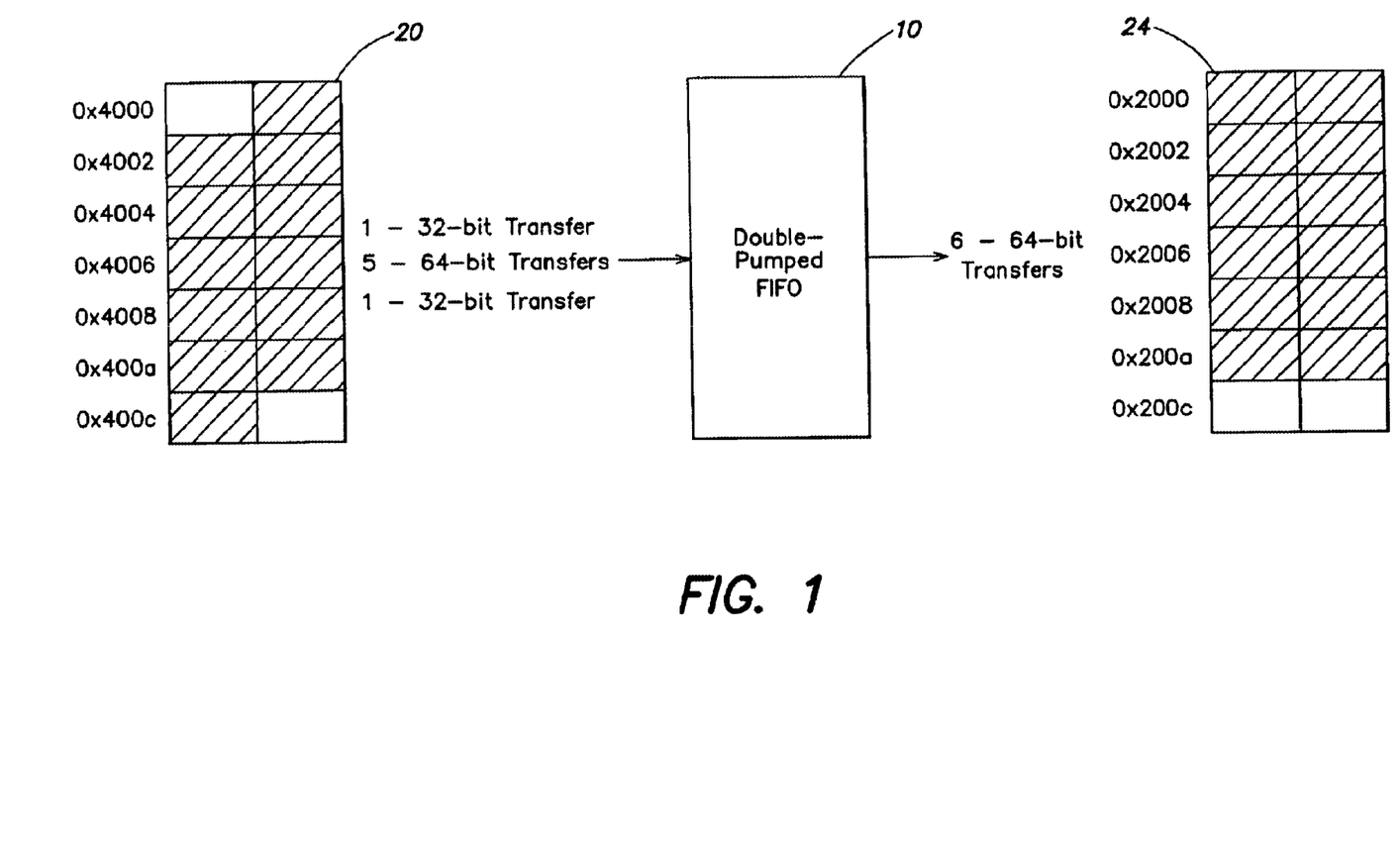
FIG. 1 is a schematic diagram that illustrates a DMA transfer using an intelligent FIFO buffer in accordance with an embodiment of the invention.

A data transfer using a data buffer implemented as an intelligent FIFO (first-in, first-out) buffer in accordance with a feature of the invention is shown in FIG. 1. An intelligent FIFO buffer 10 capable of receiving one or two data words and of sending one or two data words is utilized. In the example of FIG. 1, the data words are 32 bits in length. Double word (64-bit) transfers into the FIFO buffer occur when the source address is even (aligned to a double word boundary) and there are at least two open entries in the FIFO buffer. Double word transfers out of the FIFO buffer occur when the destination address is even and there are at least two entries in the FIFO buffer. Single word transfers into the FIFO buffer occur when the source address is odd (not aligned to a double word boundary) or there is only one word left to transfer. Single word transfers out of the FIFO buffer occur when the destination address is odd or there is only one word left to transfer. The intelligent FIFO buffer is described in connection with DMA transfers. However, it will be understood that the intelligent FIFO buffer described herein may be utilized in connection with any data transfer.

An example of a DMA transfer is illustrated in FIG. 1. The DMA transfer requires the transfer of twelve 32-bit words from source address 0x4001 in source 20 to destination address 0x2000 in destination 24. The transfer into FIFO buffer 10 is performed as one 32-bit single word transfer from source address 0x4001, five 64-bit double word transfers starting at source address 0x4002 and one 32-bit single word transfer from address 0x400c. Thus, the transfer from source 20 into FIFO buffer 10 is completed in seven clock cycles. The transfer from FIFO buffer 10 to destination 24 is performed as six 64-bit double word transfers starting at destination address 0x2000. Thus, the transfer from FIFO buffer 10 to destination 24 is completed in six clock cycles. As described below, the single and double word transfers are performed automatically by the FIFO control logic.

Figure 2:
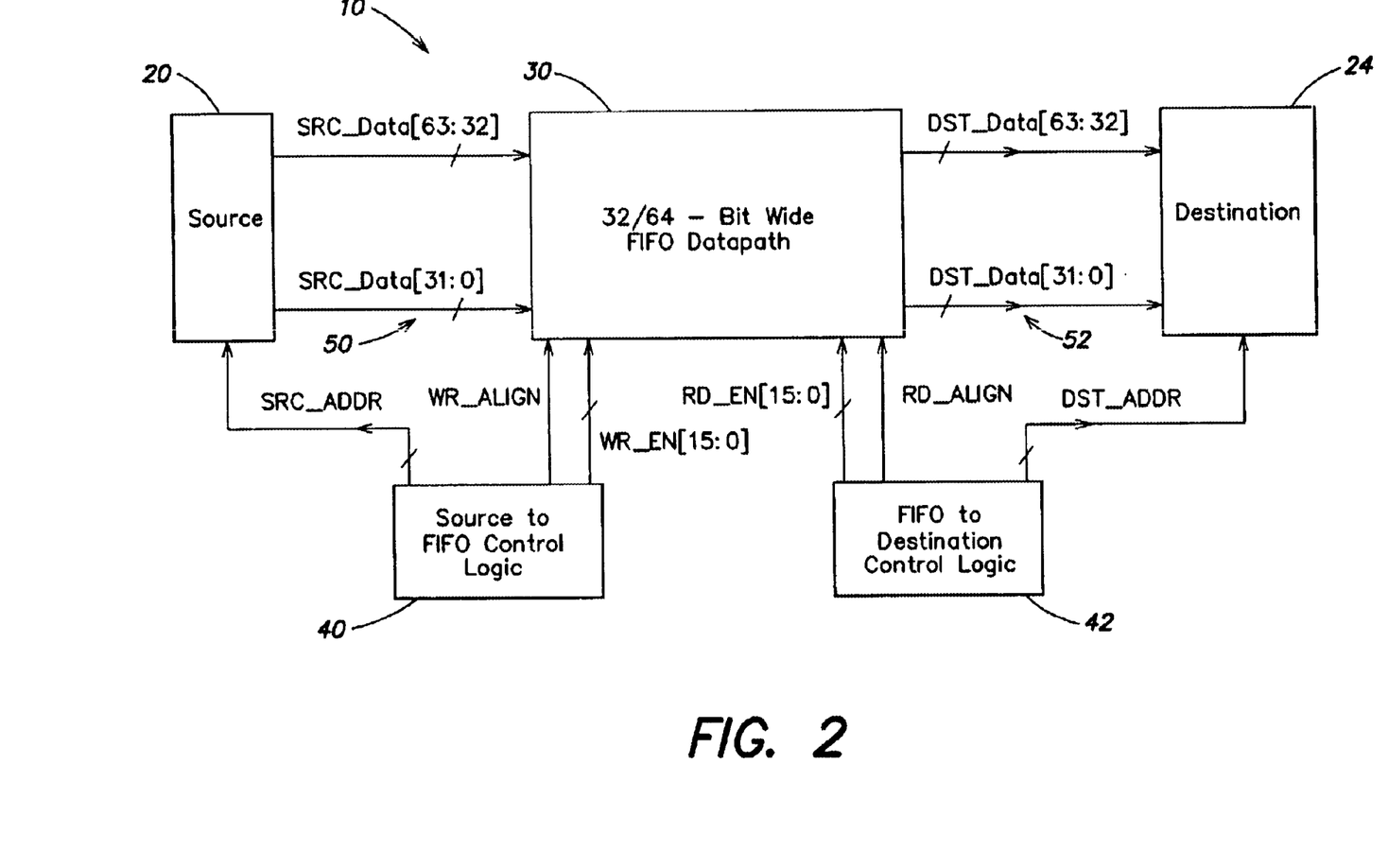
FIG. 2 is a block diagram of an intelligent FIFO buffer in accordance with an embodiment of the invention.

A block diagram of an embodiment of FIFO buffer 10 is shown in FIG. 2. FIFO buffer 10 includes a FIFO datapath buffer 30, source to FIFO control logic 40, and FIFO to destination control logic 42. FIFO datapath buffer 30 provides a double word datapath between source 20 and destination 24. A data bus 50 having a double word width of 64 bits is coupled between source 20 and a data input to FIFO datapath buffer 30. In particular, data bus 50 includes SRC_DATA[31:0] and SRC_DATA[63:32]. A data bus 52 having a double word width of 64 bits is coupled between a data output of FIFO datapath buffer 30 and destination 24. In particular, data bus 52 includes DST_DATA[31:0] and DST_DATA[63:32]. The source to FIFO control logic 40 provides a source address, SRC_ADDR, to source 20 and provides a write align signal, WR_ALIGN, and a write enable signal, WR_EN[15:0], to FIFO datapath buffer 30. The FIFO to destination control logic 42 provides a destination address, DST_ADDR, to destination 24 and provides a read align signal, RD_ALIGN, and a read enable signal, RD_EN[15:0], to FIFO datapath buffer 30. As described below, the write enable and read enable signals each include sixteen lines for enabling a specific location in FIFO datapath buffer 30.

In general, source 20 may comprise any data source, and destination 24 may comprise any data destination. Typically, data transfers are performed between two memories. By way of example, source 20 may comprise the internal memory of a digital signal processor (DSP), and destination 24 may comprise an external memory, such as a host memory, in a DSP system. The FIFO buffer 10 is preferably configured for bi-directional data transfers, wherein the roles of the source and the destination are reversed. In the above example, a DMA transfer may be performed from internal memory to external memory or from external memory to internal memory. The bi-directional feature may be implemented by providing selection logic at the input and output of FIFO buffer 10.

Figure 3:
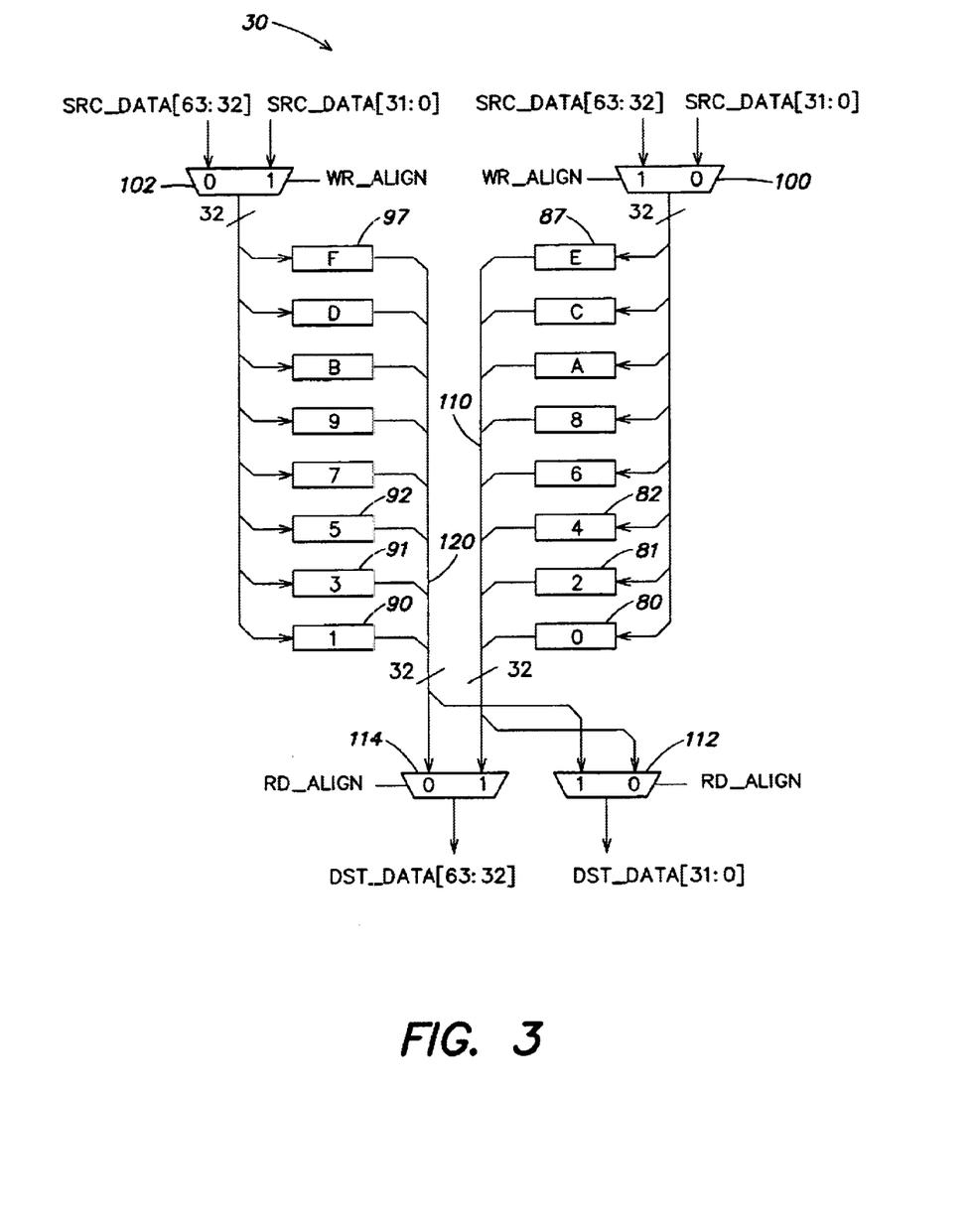
FIG. 3 is a block diagram of the datapath buffer shown in FIG. 2.

A block diagram of an embodiment of FIFO datapath buffer 30 is shown in FIG. 3. In the embodiment of FIG. 3, FIFO datapath buffer 30 includes sixteen 32-bit FIFO locations, including even FIFO locations 80, 81, 82, . . . 87 and odd FIFO locations 90, 91, 92, . . . 97. Each FIFO location is a 32-bit data storage element in this embodiment. It will be understood that FIFO datapath buffer 30 may include more or fewer than sixteen FIFO locations and that each data storage element may include more or fewer than 32 bits.

A data selector 100 is connected to the data inputs of even FIFO locations 80, 81, 82, . . . 87, and a data selector 102 is connected to the data inputs of odd FIFO locations 90, 91, 92, . . . 97. The data selectors 100 and 102 are controlled by the write align signal, WR_ALIGN, such that the source data words on data bus 50 (SRC_DATA[31:0] and SRC_DATA[63:32]) are swapped or not swapped, depending on the state of the write align signal. In one state of the write align signal, the low data word (SRC_DATA[31:0]) is written to an even FIFO location, and the high data word (SRC_DATA[63:32]) is written to the following odd address. In the other state of the write align signal, the high and low data words are swapped.

The data outputs of even FIFO locations 80, 81, 82, . . . 87 are connected via data bus 110 to a first input of a data selector 112 and to a first input of a data selector 114. The data outputs of odd FIFO locations 90, 91, 92, . . . 97 are connected via a data bus 120 to a second input of data selector 112 and to a second input of data selector 114. The data selectors 112 and 114 are controlled by the read align signal, RD_ALIGN, such that the destination data words on data bus 52 are swapped or not swapped, depending on the state of the read align signal. In one state of the read align signal, the low data word (DST_DATA[31:0]) is read from an even FIFO location, and the high data word (DST_DATA[63:32]) is read from the following odd address. In the other state of the read align signal, the high and low data words are swapped.

The write enable signal, WR_EN[15:0], may be a 16-bit bus having one line for each FIFO location in FIFO datapath buffer 30. For a two word (64-bit) write access, two consecutive bits of the write enable bus are active. For a single word write, only one bit of the write enable bus is active. The read enable signal, RD_EN[15:0], may be a 16-bit bus having one line for each FIFO location in FIFO datapath buffer 30. For a two word (64-bit) read access, two consecutive bits of the read enable bus are active. For a single word read, only one bit is active. In FIG. 3, the write enable bus and the read enable bus each have one of its sixteen signals connected to one of the FIFO locations. Bit 0 is connected to FIFO location 80, and bit 15 is connected to FIFO location 97 for each bus.

Figure 4:
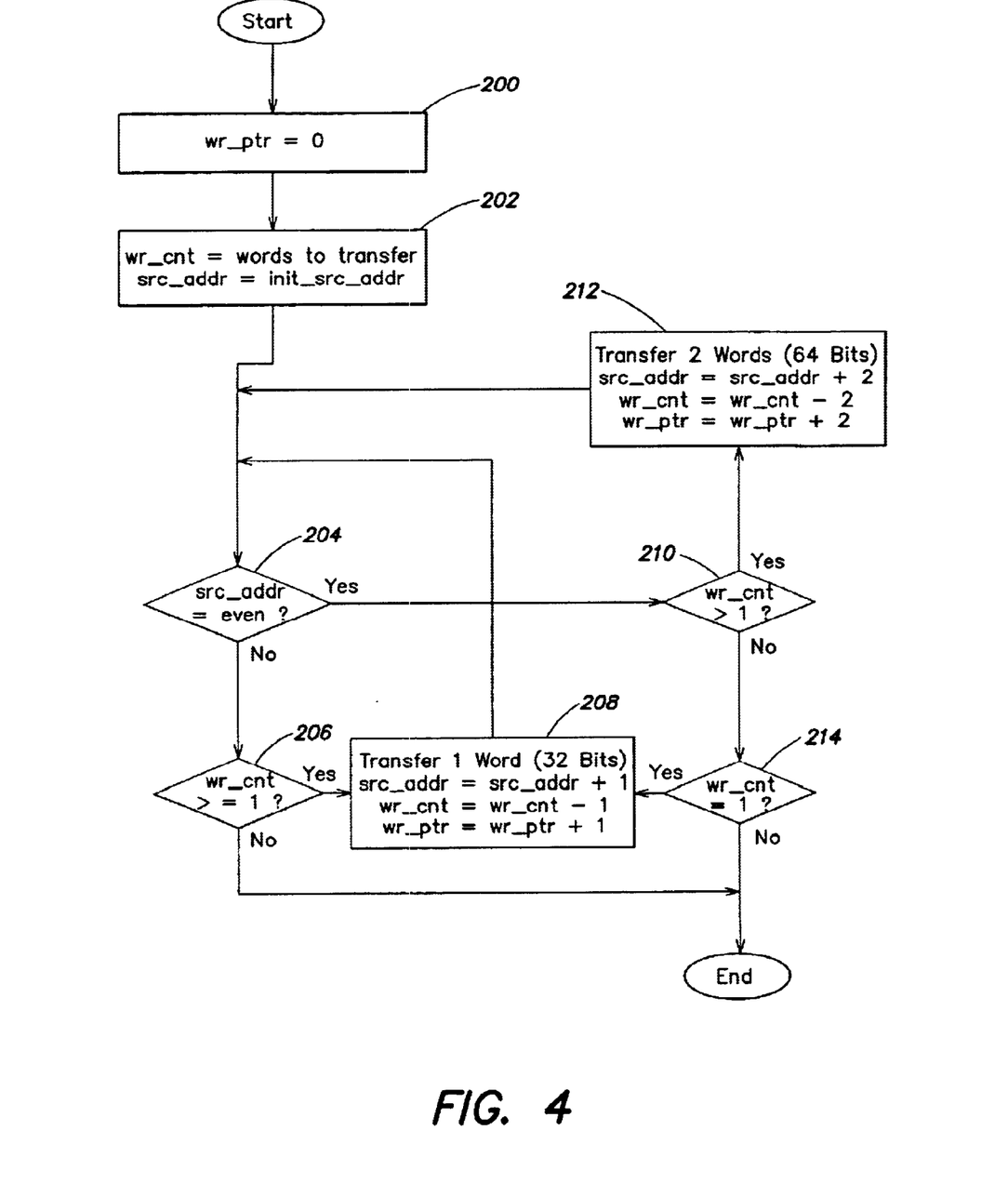
FIG. 4 is a flow chart that illustrates operation of the source to FIFO control logic of FIG. 2.

A flow chart of the operations performed by the source to FIFO control logic 40 in accordance with an embodiment of the invention is shown in FIG. 4. In step 200, a write pointer register is set to zero. In step 202, a write count register is loaded with a number of data words to transfer, and a source address register is loaded with an initial source address. The write pointer register, the write count register and the source address register are programmable registers in source to FIFO control logic 40. The write pointer register is set and the write count and source address registers are loaded under program control when a data transfer is to be performed. The write count is the number of words remaining to be written into the FIFO buffer. The write pointer points to the FIFO location to be written. The source address is the address from which data is to be written to the FIFO buffer. The initial source address is the first source location from which data is to be transferred into the FIFO buffer.

The data transfer from source 20 to FIFO buffer 10 depends on a source transfer condition, which may have two or more states. In a preferred embodiment, a first source transfer condition is an aligned, or even, source address, and a second source transfer condition is a non-aligned, or odd, source address.

In step 204, a determination is made as to whether the source address is even. If the source address is determined in step 204 to be not even (odd), a determination is made in step 206 as to whether the write count is equal to or greater than 1. If the write count is determined in step 206 to be equal to or greater than 1, one 32-bit data word is transferred from source 20 to FIFO buffer 10 in step 208. To perform the single word transfer, source to FIFO control logic 40 provides the source address and a single word read request to source 20 and provides a write align signal and an appropriate single word write enable signal (one line active) to FIFO datapath buffer 30. In addition, the source address register is incremented by 1, the write count register is decremented by 1, and the write pointer register is incremented by 1 in step 208. The process then returns to step 204. If the write count is determined in step 206 to be not equal to or greater than 1, the transfer from the source to the FIFO buffer is complete.

If the source address is determined in step 204 to be even, a determination is made in step 210 as to whether the write count is greater than 1. If the write count is greater than 1, two 32-bit data words are transferred from source 20 to FIFO buffer 10 in step 212. To perform the double word transfer, source to FIFO control logic 40 provides the source address and a double word read request to source 20 and provides a write align signal and an appropriate double word write enable signal (two lines active) to FIFO datapath buffer 30. In addition, the source address register is incremented by 2, the write count register is decremented by 2, and the write pointer register is incremented by 2 in step 212. The process then returns to step 204. If the write count is determined in step 210 to be not greater than 1, a determination is made in step 214 as to whether the write count is equal to 1. If the write count is determined in step 214 to be equal to 1, one data word is transferred in step 208. In addition, the source address register is incremented by 1, the write count register is decremented by 1, and the write pointer is incremented by 1 in step 208. The process then returns to step 204. If the write count is determined in step 214 to be not equal to 1, the transfer from the source to the FIFO buffer is complete.

Figure 5:
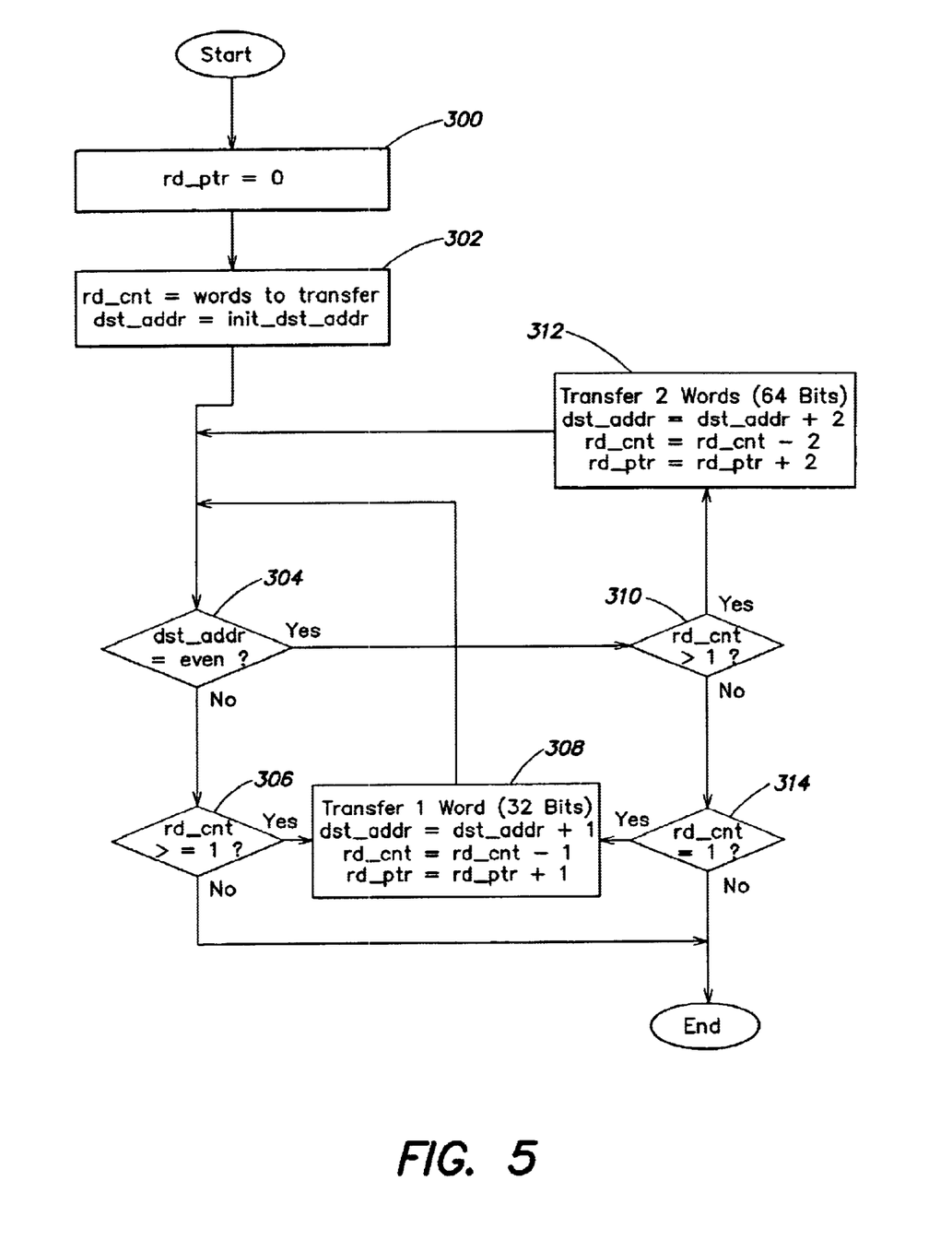
FIG. 5 is a flow chart that illustrates operation of the FIFO to destination control logic of FIG. 2.

A flow chart of the operations performed by the FIFO to destination control logic 42 in accordance with an embodiment of the invention is shown in FIG. 5. A read pointer register is set to zero in step 300. In step 302, a read count register is loaded with the number of words to transfer, and a destination address register is loaded with an initial destination address. The read pointer register, the read count register and the destination address register are programmable registers in FIFO to destination control logic 42. The read pointer register is set and the read count and destination address registers are loaded under program control. The read pointer points to the FIFO location to be read. The read count represents the number of words remaining to be read from the FIFO buffer. The destination address is the address to which data from the FIFO buffer is to be written. The initial destination address is the first destination location to which data from the FIFO is to be written.

The data transfer from FIFO buffer 10 to destination 24 depends on a destination transfer condition, which may have two or more different states. In a preferred embodiment, a first destination transfer condition is an aligned, or even, destination address, and a second destination transfer condition is a non-aligned, or odd, destination address.

In step 304, a determination is made as to whether the destination address is even. If the destination address is determined in step 304 to be not even (odd), a determination is made in step 306 as to whether the read count is equal to or greater than 1. If the read count is determined in step 306 to be equal to or greater than 1, one data word is transferred from the FIFO buffer to the destination 24 in step 308. To perform the single word transfer, FIFO to destination control logic 42 provides the destination address and a single word write request to destination 24 and provides a read align signal and an appropriate single word read enable signal (one line active) to FIFO datapath buffer 30. In addition, the destination address register is incremented by 1, the read count register is decremented by 1, and the read pointer register is incremented by 1 in step 308. The process then returns to step 304. If the read count is determined in step 306 to be not equal to or greater than 1, the FIFO to destination transfer is complete.

If the destination address is determined in step 304 to be even, a determination is made in step 310 as to whether the read count is greater than 1. If the read count is determined in step 310 to be greater than 1, two data words are transferred from the FIFO buffer to the destination 24 in step 312. To perform the double word transfer, FIFO to destination control logic 42 provides the destination address and a double word write request to destination 24 and provides a read align signal and an appropriate double word read enable signal (two lines active) to FIFO datapath buffer 30. In addition, the destination address register is incremented by 2, the read count register is decremented by 2, and the read pointer is incremented by 2 in step 312. The process then returns to step 304. If the read count is determined in step 310 to be not greater than 1, a determination is made in step 314 as to whether the read count is equal to 1. If the read count is determined in step 314 to be equal to 1, one data word is transferred from the FIFO buffer to the destination in step 308. In addition, the destination address register is incremented by 1, the read count register is decremented by 1, and the read pointer register is incremented by 1 in step 308. The process then returns to step 304. If the read count is determined in step 314 to be not equal to 1, the FIFO to destination transfer is complete.

The FIFO buffer 10 has been described above in connection with transfer of single and double 32-bit data words. It will be understood that the invention is not limited to the transfer of single and double 32-bit data words. In general, data words of any bit length may be transferred. Furthermore, different numbers of data words may be transferred in response to different source transfer conditions and destination transfer conditions, such as aligned or non-aligned. In addition, the FIFO buffer may be configured to transfer more than two different data word sizes in response to more than two different source transfer conditions and destination transfer conditions. For example, the FIFO buffer may be configured to transfer 32 bits, 64 bits or 128 bits in response to three different transfer conditions, or may be configured to transfer 8-bit bytes, 16 bits, 32 bits or 64 bits in response to four different transfer conditions.

The source to FIFO control logic 40 as shown in FIG. 4, and the FIFO to destination control logic 42 as shown in FIG. 5 operate separately and simultaneously. The source to FIFO control logic 40 allows writing of data words in the FIFO buffer only when space is available. Similarly, the FIFO to destination control logic 42 reads data words from the FIFO buffer only when there are valid entries waiting to be read.

The intelligent FIFO buffer described above permits a mixture of double word transfers and single word transfers in a single data transfer. Data alignment is resolved without intervention from the programmer. The FIFO buffer packs single word and double word entries without any empty FIFO locations. The FIFO buffer includes independent control logic for source to FIFO and FIFO to destination data transfers.

While there have been shown and described what are at present considered the preferred embodiments of the present invention, it will be obvious to those skilled in the art that various changes and modifications may be made therein without departing from the scope of the invention as defined by the appended claims.

What is claimed is:

1. Apparatus for transferring data words from a source to a destination, comprising:
   a datapath buffer coupled by a first data bus to the source and coupled by a second data bus to the destination;
   write control logic for writing a first number of data words in said datapath buffer in response to a first source transfer condition and for writing a second number of data words in said datapath buffer in response to a second source transfer condition, wherein the first source transfer condition comprises an aligned source address and the second source transfer condition comprises a non-aligned source address; and
   read control logic for reading the first number of data words from said datapath buffer in response to a first destination transfer condition and for reading the second number of data words from said datapath buffer in response to a second destination transfer condition.

2. Apparatus as defined in claim 1, wherein said datapath buffer comprises a first-in, first-out (FIFO) datapath buffer.

3. Apparatus as defined in claim 1, wherein the first number of data words is written in said datapath buffer or read from said datapath buffer in a single transfer cycle and wherein the second number of data words is written in said datapath buffer or read from said datapath buffer in a single transfer cycle.

4. Apparatus as defined in claim 1, wherein the first number of data words comprises a double data word and the second number of data words comprises a single data word.

5. Apparatus as defined in claim 4, wherein the first and second data buses have a double word width.

6. Apparatus as defined in claim 1, wherein said datapath buffer, said write control logic and said read control logic are configured for bi-directional data transfer between the source and the destination.

7. Apparatus as defined in claim 1, wherein said data buffer, said write control logic and said read control logic are configured to transfer a block of data words from the source to the destination as a contiguous stream of data words.

8. Apparatus as defined in claim 1, wherein the first and second source transfer conditions each includes a count of data words to transfer into said datapath buffer.

9. Apparatus for transferring data words from a source to a destination, comprising:
   a datapath buffer coupled by a first data bus to the source and coupled by a second data bus to the destination;
   write control logic for writing a first number of data words in said datapath buffer in response to a first source transfer condition and for writing a second number of data words in said datapath buffer in response to a second source transfer condition; and
   read control logic for reading the first number of data words from said datapath buffer in response to a first destination transfer condition and for reading the second number of data words from said datapath buffer in response to a second destination transfer condition, wherein the first destination transfer condition comprises an aligned destination address and the second destination transfer condition comprises a non-aligned destination address.

10. Apparatus as defined in claim 9, wherein the first and second destination transfer conditions each includes a count of data words to transfer from said datapath buffer.

11. Apparatus for transferring data words from a source to a destination, comprising:
   a datapath buffer coupled by a first data bus to the source and coupled by a second data bus to the destination;
   write control logic for writing a first number of data words in said datapath buffer in response to a first source transfer condition and for writing a second number of data words in said datapath buffer in response to a second source transfer condition; and
   read control logic for reading the first number of data words from said datapath buffer in response to a first destination transfer condition and for reading the second number of data words from said datapath buffer in response to a second destination transfer condition, wherein the first source transfer condition comprises an even source address, the second source transfer condition comprises an odd source address, the first destination transfer condition comprises an even destination address and the second destination transfer condition comprises an odd destination address.

12. Apparatus for transferring data words from a source to a destination comprising:
   a datapath buffer coupled by a first data bus to the source and coupled by a second data bus to the destination;
   write control logic for writing a first number of data words in said datapath buffer in response to a first source transfer condition and for writing a second number of data words in said datapath buffer in response to a second source transfer condition; and
   read control logic for reading the first number of data words from said datapath buffer in response to a first destination transfer condition and for reading the second number of data words from said datapath buffer in response to a second destination transfer condition, wherein said datapath buffer comprises a first set of storage locations, a second set of storage locations and write alignment logic for directing data words from high and low sections of the first data bus to said first and second sets of storage locations in response to a write align signal.

13. Apparatus for transferring data words from a source to a destination, comprising:
a datapath buffer coupled by a first data bus to the source and coupled by a second data bus to the destination;
write control logic for writing a first number of data words in said datapath buffer in response to a first source transfer condition and for writing a second number of data words in said datapath buffer in response to a second source transfer condition; and
read control logic for reading the first number of data words from said datapath buffer in response to a first destination transfer condition and for reading the second number of data words from said datapath buffer in response to a second destination transfer condition, wherein said datapath buffer comprises a first set of storage locations, a second set of storage locations, and read alignment logic for directing data words from said first and second sets of storage locations to high and low sections of the second data bus in response to a read align signal.

14. Apparatus for transferring data words from a source to a destination, comprising:
a first-in, first-out (FIFO) datapath buffer coupled by a source data bus to the source and coupled by a destination data bus to the destination;
write control logic for writing a double data word in said FIFO datapath buffer in response to an aligned source address and for writing a single data word in said FIFO datapath buffer in response to a non-aligned source address; and
read control logic for reading a double data word from said FIFO datapath buffer in response to an aligned destination address and for reading a single data word from said FIFO datapath buffer in response to a non-aligned destination address.

15. Apparatus as defined in claim 14, wherein double data words are written in said FIFO datapath buffer or read from said FIFO datapath buffer in a single transfer cycle and wherein a single data word is written in said FIFO datapath buffer or read from said FIFO datapath buffer in a single transfer cycle.

16. Apparatus as defined in claim 14, wherein said FIFO datapath buffer, said write control logic and said read control logic are configured for bi-directional data transfer between the source and the destination.

17. Apparatus as defined in claim 14, wherein said FIFO datapath buffer comprises even FIFO locations, odd FIFO locations and write alignment logic for directing data words from high and low sections of the source data bus to said even and odd FIFO locations in response to a write align signal.

18. Apparatus as defined in claim 14, wherein said FIFO datapath buffer comprises even FIFO locations, odd FIFO locations and read alignment logic for directing data words from said even and odd FIFO locations to high and low sections of the destination data bus in response to a read align signal.

19. Apparatus as defined in claim 14, wherein the write control logic further comprises a write count register for holding a count of data words to transfer into said FIFO datapath buffer and wherein the read control logic further comprises a read count register for holding a count of data words to transfer from said FIFO datapath buffer.

20. A method for transferring data words from a source to a destination, comprising the steps of:
providing a datapath buffer coupled by a first data bus to the source and coupled by a second data bus to the destination;
writing a first number of data words in said datapath buffer in response to a first source transfer condition;
writing a second number of data words in said datapath buffer in response to a second source transfer condition, wherein the first source transfer condition comprises an aligned source address and the second source transfer condition comprises a non-aligned source address;
reading the first number of data words from said datapath buffer in response to a first destination transfer condition; and
reading the second number of data words from said datapath buffer in response to a second destination transfer condition.

21. A method as defined in claim 20, wherein the step of providing a datapath buffer comprises providing a first-in, first-out (FIFO) datapath buffer.

22. A method as defined in claim 20, wherein the first destination transfer condition comprises an aligned destination address and the second destination transfer condition comprises a non-aligned destination address.

23. A method as defined in claim 22, wherein the first number of data words comprises a double data word and the second number of data words comprises a single data word.

24. A method as defined in claim 22, wherein the first and second destination transfer conditions each includes a count of data words to transfer from said datapath buffer.

25. A method as defined in claim 20, wherein each of the steps of writing a first number of data words, writing a second number of data words, reading the first number of data words and reading the second number of data words is performed in a single transfer cycle.

26. A method as defined in claim 20, further comprising the step of transferring a specified number of data words from the source to the destination on successive transfer cycles.

27. A method as defined in claim 20, further comprising the steps of:
writing a third number of data words in said datapath buffer in response to a third source transfer condition; and
reading the third number of data words from said datapath buffer in response to a third destination transfer condition.

28. A method as defined in claim 20, wherein the first and second source transfer conditions each includes a count of data words to transfer into said datapath buffer.

29. Apparatus for transferring data words, comprising:
a datapath buffer coupled by a data bus to a source; and
write control logic for writing a first number of data words in said datapath buffer in response to a first source transfer condition and for writing a second number of data words in said datapath buffer in response to a second source transfer condition, wherein the first source transfer condition comprises an aligned source address and the second source transfer condition comprises a non-aligned source address.

30. Apparatus as defined in claim 29, wherein said datapath buffer comprises a first-in, first-out (FIFO) datapath buffer.

31. Apparatus as defined in claim 29, wherein the first number of data words is written in said datapath buffer in a single transfer cycle and wherein the second number of data words is written in said datapath buffer in a single transfer cycle.

32. Apparatus as defined in claim 29, wherein the first number of data words comprises a double data word and the second number of data words comprises a single data word.

33. Apparatus for transferring data words, comprising:

a datapath buffer coupled by a data bus to a destination; and read control logic for reading a first number of data words from said datapath buffer in response to a first destination transfer condition and for reading a second number of data words from said datapath buffer in response to a second destination transfer condition, wherein the first destination transfer condition comprises an aligned destination address and the second destination transfer condition comprises a non-aligned destination address.

34. Apparatus as defined in claim 33, wherein said datapath buffer comprises a first-in, first-out (FIFO) datapath buffer.

35. Apparatus as defined in claim 33, wherein the first number of data words is read from said datapath buffer in a single transfer cycle and wherein the second number of data words is read from said datapath buffer in a single transfer cycle.

36. Apparatus as defined in claim 33, wherein the first number of data words comprises a double data word and the second number of data words comprises a single data word.

37. A method for transferring data words, comprising the steps of:

providing a datapath buffer coupled by a data bus to a source;

writing a first number of data words in said datapath buffer in response to a first source transfer condition; and writing a second number of data words in said datapath buffer in response to a second source transfer condition, wherein the first source transfer condition comprises an aligned source address and the second source transfer condition comprises a non-aligned source address.

38. A method for transferring data words, comprising the steps of:

providing a datapath buffer coupled by a data bus to a destination;

reading a first number of data words from said datapath buffer in response to a first destination transfer condition; and reading a second number of data words from said datapath buffer in response to a second destination transfer condition, wherein the first destination transfer condition comprises an aligned destination address and the second destination transfer condition comprises a non-aligned destination address.

\* \* \* \* \*